(12) United States Patent
Liu et al.

(10) Patent No.: US 9,042,134 B2
(45) Date of Patent: May 26, 2015

(54) GRID-CONNECTED INVERTER AND METHOD FOR FILTERING AC OUTPUT THEREOF

(75) Inventors: Weizeng Liu, Shanxi (CN); Shaohua Ruan, Shanxi (CN); Xintao Zhang, Shanxi (CN)

(73) Assignees: TBEA SUNOASIS CO., LTD., Xinjiang (CN); TBEA XI'AN ELECTRIC TECHNOLOGY CO., LTD., Shanxi (CN)

( * ) Notice: Subject to any disclaimer, the term of this patent is extended or adjusted under 35 U.S.C. 154(b) by 267 days.

(21) Appl. No.: 13/701,298

(22) PCT Filed: May 5, 2011

(86) PCT No.: PCT/CN2011/000790
§ 371 (c)(1),
(2), (4) Date: Nov. 30, 2012

(87) PCT Pub. No.: WO2012/065348
PCT Pub. Date: May 24, 2012

(65) Prior Publication Data
US 2013/0070490 A1  Mar. 21, 2013

(30) Foreign Application Priority Data
Nov. 17, 2010 (CN) .......................... 2010 1 0553722

(51) Int. Cl.
*H02M 1/12* (2006.01)
*H02M 3/24* (2006.01)
(Continued)

(52) U.S. Cl.
CPC ............ *H02M 1/12* (2013.01); *H02M 7/53871* (2013.01); *H02J 3/383* (2013.01); *Y02E 10/563* (2013.01)

(58) Field of Classification Search
CPC . H02M 1/12; H02M 7/493; H02M 2001/007; H02M 2001/123
USPC .......................... 363/34–48, 95–98, 125–131
See application file for complete search history.

(56) References Cited

U.S. PATENT DOCUMENTS 4,151,387 A * 4/1979 Peters, Jr. ...................... 219/626
4,488,200 A * 12/1984 Matsuzaki .................... 361/104
(Continued)

FOREIGN PATENT DOCUMENTS

| CN | 102005953 A | 4/2011 |
|---|---|---|
| JP | 7177750 A | 7/1995 |
| JP | 2005328637 A | 11/2005 |

*Primary Examiner* — Timothy J Dole
*Assistant Examiner* — Yusef Ahmed
(74) *Attorney, Agent, or Firm* — The Webb Law Firm

(57) ABSTRACT

Disclosed is a grid-connected inverter and a method for filtering AC output thereof. The grid-connected inverter includes an AC output filter which includes two or more switchable filtering modules, with the power capacity of each filtering module corresponding to a different output power of the grid-connected inverter; a monitoring module which is used to perform realtime monitoring on voltage and current outputted by the grid-connected inverter; and a control circuit which is used to calculate an output power grade of the grid-connected inverter according to the voltage and the current monitored by the monitoring module and control switching to the filtering module having a corresponding power capacity according to the power grade, the power grade being selected from a plurality of power grades which are divided according to power capacities of the filtering modules.

12 Claims, 3 Drawing Sheets

(51) Int. Cl.
*H02M 7/5387* (2007.01)
*H02J 3/38* (2006.01)

(56) References Cited

U.S. PATENT DOCUMENTS

| | | | | |
|---|---|---|---|---|
| 4,558,292 | A | * | 12/1985 | Sasaki et al. ............... 333/173 |
| 5,198,970 | A | * | 3/1993 | Kawabata et al. ............ 363/37 |
| 5,942,884 | A | * | 8/1999 | Soar et al. .................. 323/282 |
| 6,194,885 | B1 | * | 2/2001 | Oshima ........................ 323/285 |
| 6,914,418 | B2 | * | 7/2005 | Sung ............................ 320/140 |
| 6,956,755 | B2 | * | 10/2005 | Nielsen ........................ 363/132 |
| 2002/0163819 | A1 | * | 11/2002 | Treece ............................ 363/34 |
| 2003/0007369 | A1 | * | 1/2003 | Gilbreth et al. ................ 363/35 |
| 2003/0193302 | A1 | * | 10/2003 | Huber et al. .................. 315/291 |
| 2004/0245783 | A1 | * | 12/2004 | Gilbreth et al. ................ 290/52 |
| 2006/0066112 | A1 | * | 3/2006 | Geis et al. ....................... 290/52 |
| 2008/0191759 | A1 | * | 8/2008 | Neurauter et al. ............ 327/157 |
| 2009/0116266 | A1 | * | 5/2009 | Lai et al. .......................... 363/40 |
| 2009/0129128 | A1 | * | 5/2009 | Hirahara ........................ 363/49 |
| 2009/0283129 | A1 | * | 11/2009 | Foss ............................. 136/244 |
| 2009/0315470 | A1 | * | 12/2009 | Kumagai et al. .............. 315/224 |
| 2010/0308584 | A1 | * | 12/2010 | Coates et al. ................... 290/44 |
| 2011/0249475 | A1 | * | 10/2011 | Fujii et al. ....................... 363/50 |
| 2012/0069602 | A1 | * | 3/2012 | Escobar et al. ................. 363/13 |

* cited by examiner

GRID-CONNECTED INVERTER AND METHOD FOR FILTERING AC OUTPUT THEREOF

FIELD OF THE INVENTION

The present invention belongs to the technical field of grid-connected inverters, and specifically relates to a grid-connected inverter and a method for filtering AC output thereof.

BACKGROUND OF THE INVENTION

With wide application of grid-connected power generation technologies, grid companies pay more attention to quality of electric energy outputted by a grid-connected inverter. To reduce harmonics of grid-connected output and improve quality of electric energy, strict requirements for content of harmonics of respective orders and total harmonic content in a grid-connected current have been raised in Chinese and foreign photovoltaic power generation standards (for example, UL1741, IEEE 929-2000). There are many factors which affect the harmonics in the grid-connected current, and the influence of a manner for filtering the AC output of the grid-connected inverter on the harmonics in the grid-connected current is mainly discussed in the present invention.

At present, output filters used in grid-connected inverter are all designed according to the rated output power of the grid-connected inverter. When the output power of the grid-connected inverter is the rated output power, the harmonic distortion of the output current waveform of the grid-connected inverter can meet the requirements of relevant standards of the grid-connected inverter well. However, in the case of light load, especially when a load factor is lower than 25% and the output power of the inverter is far lower than the rated output power, the following two serious problems will occur:

(1) In the case of low load factor, the harmonic content of the grid-connected current exceeds the standards severely due to low modulation ratio and low switch duty ratio, which leads to great harmonic pollution to the power grid.

(2) In the case of light load, the conversion efficiency of the inverter is reduced largely due to the increase of the proportion of no-load loss of the filters.

Such problems are especially serious for a photovoltaic grid-connected inverter. Due to natural change of sunshine intensity in a day, the photovoltaic grid-connected inverter keeps being operated at a lower load factor during most of the day. In this case, as described above, the photovoltaic grid-connected inverter has the problems that the harmonic content of the grid-connected current exceeds the standards and the conversion efficiency of the inverter is reduced, so that quality of the outputted electric energy is degraded. However, a solution to such problems is still absent up to now.

SUMMARY OF THE INVENTION

In order to solve the above problems, the present invention provides a grid-connected inverter and a method for filtering the AC output thereof, so that the total harmonic distortion (THD) of the output current waveform of the grid-connected inverter can meet the requirements of the relevant standards even in the case of a low load factor and the conversion efficiency of the grid-connected inverter in the case of the low load factor can be improved.

To attain the above object, the present invention provides a grid-connected inverter comprising: an AC output filter which includes two or more switchable filtering modules connected in parallel, power capacity of each of the filtering modules corresponding to a different output power of the grid-connected inverter; a monitoring module which is connected to an AC output end of the grid-connected inverter and is used to perform realtime monitoring on AC voltage and AC current outputted by the grid-connected inverter; and a control circuit which is connected between the monitoring module and the AC output filter, and is used to calculate the output power of the grid-connected inverter according to the voltage and the current monitored by the monitoring module and control, according to a power grade of the obtained output power, switching to the filtering module having the power capacity corresponding to the power grade, the power grade being selected from a plurality of power grades which are divided according to power capacities of the filtering modules.

Preferably, each of the filtering modules includes an LC/LCL AC filter and a first AC contactor which are connected in series, a filter capacitor branch in the LC/LCL AC filter includes a filter capacitor and a second AC contactor which are connected in series, and the control circuit controls switching to the corresponding filtering module by controlling on-off states of the first AC contactor and the second AC contactor in each of the filtering modules.

Preferably, in each of the filtering modules, a model of the filter capacitor and that of the second AC contactor are selected according to the power capacity of each filtering module, and the model of the first AC contactor is selected according to a magnitude of an output current of the grid-connected inverter.

Preferably, the AC output filter includes two filtering modules connected in parallel, wherein, one serves as a main filtering module whose power capacity is the rated output power of the grid-connected inverter, and the other serves as an auxiliary filtering module whose power capacity is 5%~40% of the rated output power of the grid-connected inverter.

Preferably, the power capacity of the auxiliary filtering module is 15%~30% of the rated output power of the grid-connected inverter.

Preferably, the monitoring module is further used to perform realtime monitoring on grid-connection conditions of the grid-connected inverter and determine whether the grid-connected inverter satisfies the grid-connection conditions, and the control circuit is further used to control the on-off state of the AC output filter according to a result obtained by the monitoring module of whether the grid-connected inverter satisfies the grid-connection conditions, that is, if the grid-connection conditions are not satisfied, the control circuit performs control to turn off all the filtering modules in the AC output filter; and if the grid-connection conditions are satisfied, the control circuit performs control to turn on a corresponding filtering module in the AC output filter.

Preferably, the number of the filtering modules in the AC output filter is selected according to the range of the output power of the grid-connected inverter and harmonic requirements for the grid-connected inverter in the case of the lowest load factor.

Correspondingly, the present invention provides a method for filtering the AC output of a grid-connected inverter, the grid-connected inverter comprising an AC output filter which includes two or more switchable filtering modules connected in parallel, power capacity of each filtering modules corresponding to a different output power of the grid-connected inverter, the method comprising: performing realtime monitoring on AC voltage and AC current outputted by the grid-connected inverter; calculating the output power of the grid-connected inverter according to the monitored voltage and current; and controlling, according to a power grade of the obtained output power, switching to the filtering module having the power capacity corresponding to the power grade, the power grade being selected from a plurality of power grades which are divided according to power capacities of the filtering modules.

Preferably, in the case that each of the filtering modules includes an LC/LCL AC filter and a first AC contactor which are connected in series and a filter capacitor branch in the LC/LCL AC filter includes a filter capacitor and a second AC contactor which are connected in series, switching to the corresponding filtering module is controlled by controlling on-off states of the first AC contactor and the second AC contactor in each of the filtering modules.

Preferably, in each of the filtering modules, the model of the filter capacitor and that of the second AC contactor are selected according to the power capacity of each filtering module, and the model of the first AC contactor is selected according to the magnitude of the output current of the grid-connected inverter.

Preferably, the AC output filter includes two filtering modules connected in parallel, wherein, one serves as a main filtering module whose power capacity is the rated output power of the grid-connected inverter, and the other serves as an auxiliary filtering module whose power capacity is 5%~40% of the rated output power of the grid-connected inverter.

Preferably, the power capacity of the auxiliary filtering module is 15%~30% of the rated output power of the grid-connected inverter.

Preferably, the method further comprises performing real-time monitoring on grid-connection conditions of the grid-connected inverter, and performing control to turn off all the filtering modules in the AC output filter if the grid-connection conditions are not satisfied, while performing control to turn on a corresponding filtering module in the AC output filter if the grid-connection conditions are satisfied.

Preferably, the method further comprises selecting the number of the filtering modules in the AC output filter according to the range of the output power of the grid-connected inverter and harmonic requirements for the grid-connected inverter in the case of the lowest load factor.

As seen from the above technical solutions, the present invention, according to different output powers of a grid-connected inverter, provides a plurality of filtering modules which are connected in parallel in an AC output filter of the grid-connected inverter and are designed according to different power grades, and performs corresponding switching between the filtering modules according to the realtime output power of the grid-connected inverter, so that THD of the output current waveform of the grid-connected inverter can meet the requirements of the relevant standards regardless of the output power of the grid-connected inverter and the conversion efficiency of the grid-connected inverter in the case of a low load factor can be improved effectively.

DETAILED DESCRIPTION OF THE PREFERRED EMBODIMENTS

The present invention will be described hereinafter in connection with an embodiment with reference to the accompanying drawings. In the following description, a three-phase full-bridge photovoltaic grid-connected inverter will be described as an example. However, it should be understood that the present invention is not limited to the three-phase full-bridge photovoltaic grid-connected inverter but may be applied to grid-connected inverters of any type equally.

Figure 1:
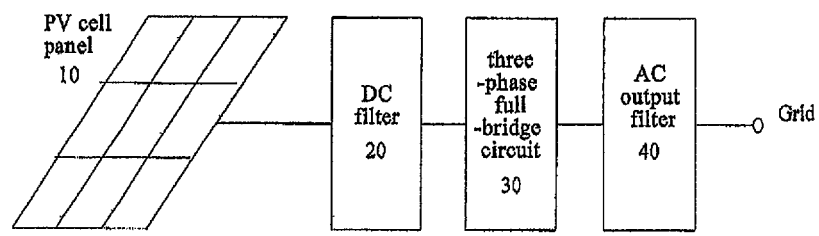
FIG. 1 is a system structure diagram of an existing three-phase full-bridge photovoltaic grid-connected inverter.

FIG. 1 is a system structure diagram of an existing three-phase full-bridge photovoltaic grid-connected inverter. As shown in FIG. 1, the photovoltaic grid-connected inverter includes a PV cell panel 10, a DC filter 20, a three-phase full-bridge circuit 30, and an AC output filter 40, wherein, an input end of the AC output filter 40 is connected to an output end (i.e. an AC output end of the grid-connected inverter) of the three-phase full-bridge circuit 30, and an output end of the AC output filter 40 is connected to the power grid as an output end of the photovoltaic grid-connected inverter. In the prior art, the AC output filter includes only one filtering module which is designed according to the rated output power of the grid-connected inverter, for example, an LC filter or an LCL filter.

Figure 2:
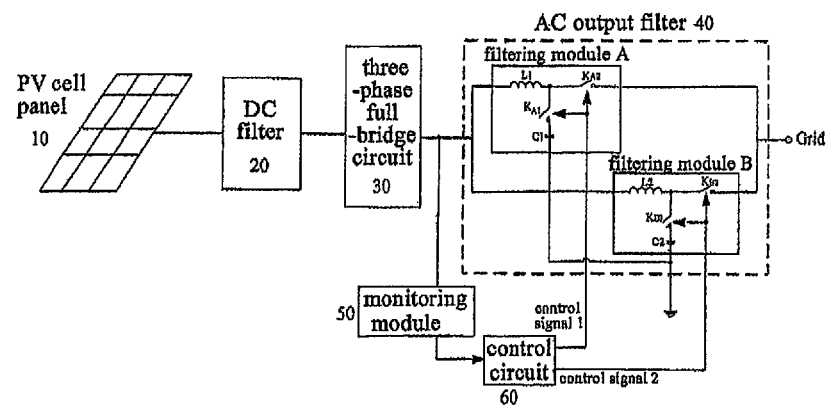
FIG. 2 is a system structure diagram of a three-phase full-bridge photovoltaic grid-connected inverter according to an embodiment of the present invention.

FIG. 2 is a system structure diagram of a three-phase full-bridge photovoltaic grid-connected inverter according to an embodiment of the present invention. As shown in FIG. 2, the AC output filter 40 of the photovoltaic grid-connected inverter is composed of two filtering modules (i.e. filtering module A and filtering module B) which have different power capacities and are connected in parallel, wherein, the filtering module A consists of an AC filter A and an AC contactor $K_{A2}$ which are connected in series, and a capacitor branch of the AC filter A consists of a capacitor C1 and an AC contactor $K_{A1}$ which are connected in series; and the filtering module B consists of an AC filter B and an AC contactor $K_{B2}$ which are connected in series, and a capacitor branch of the AC filter B consists of a capacitor C2 and an AC contactor $K_{B1}$ which are connected in series. The filtering module A is defined as an auxiliary filtering module, and the filtering module B is defined as a main filtering module. The AC contactor $K_{A2}$ and the AC contactor $K_{B2}$ are defined as a first AC contactor, and the AC contactor $K_{A1}$ and the AC contactor $K_{B1}$ in the capacitor braches are defined as a second AC contactor.

In the case that the AC output filter includes only two filtering modules connected in parallel, the power capacity of the main filtering module (the filtering module B) is set to be the rated output power of the photovoltaic grid-connected inverter, and the power capacity of the auxiliary filtering module (the filtering module A) is usually set to be 5%~40%, preferably 15%~30%, of the rated output power of the photovoltaic grid-connected inverter. For example, as for a grid-connected inverter having a rated output power of 500 KW, parameters of an inductor L1 and the capacitor C1 in the filtering module A can be designed according to the power capacity of 100 KW (that is, 20% of the rated output power), then the model of the AC contactor $K_{A1}$ connected in series to the capacitor C1 is selected according to the magnitude of the current of the capacitor C1 and the model of the AC contactor $K_{A2}$ is selected according to the magnitude of the output current of the grid-connected inverter. For model selection of the elements in the filtering module B as the main filtering module, parameters of these elements are selected according to the power capacity (500 KW) of the filtering module B with the same designing method as that of the filtering module A.

As shown in FIG. 2, the photovoltaic grid-connected inverter according to the present invention further includes a monitoring module 50 and a control circuit 60 so as to achieve switching between the filtering modules, wherein, the monitoring module 50 is connected to the AC output end of the grid-connected inverter to perform realtime monitoring on the AC voltage and the AC current outputted by the grid-connected inverter; and the control circuit 60 is connected between the monitoring module 50 and the AC output filter 40 to calculate the output power of the grid-connected inverter according to the voltage and the current monitored by the monitoring module 50 and control on-off states of the AC contactors $K_{A1}$, $K_{A2}$, $K_{B1}$ and $K_{B2}$ by sending a control signal 1 and a control signal 2 to the filtering module A and the filtering module B in the AC output filter 40 respectively according to an output power grade of the calculated output power, so as to achieve switching to the filtering module having the power capacity corresponding to the output power grade. That is, the monitoring module 50 and the control circuit 60 allow the grid-connected inverter to select different filtering modules to filter the AC output thereof in the case of different output powers in order to obtain optimal filtering effect.

The output power grade is selected from a plurality of power grades which are divided according to the power capacities of a plurality of filtering modules included in the AC output filter 40. For example, in the case that the AC output filter includes a main filtering module having a power capacity of 500 KW and an auxiliary filtering module having a power capacity of 100 KW, two power grades are divided in total, that is, a first power grade of 100 KW~500 KW and a second power grade of 0 KW~100 KW. When the output power of the grid-connected inverter belongs to the first power grade, switching to the main filtering module is made for filtering; and when the output power of the grid-connected inverter belongs to the second power grade, switching to the auxiliary filtering module is made for filtering.

As seen from FIG. 2, the present invention is different from the prior art in that the AC output filter 40 in the prior art includes only one filtering module (referred to as a single filtering manner), while the AC output filter 40 according to the present invention includes two filtering modules connected in parallel (referred to as a double filtering manner).

However, it should be understood that the AC output filter 40 according to the present invention is not limited to include only two filtering modules shown in FIG. 2, and the number of the filtering modules connected in parallel is determined by the range of the output power of the grid-connected inverter and harmonic requirements for the grid-connected inverter in the case of the lowest load factor. Generally, if the range of the output power of the grid-connected inverter is wide and the harmonic requirements are strict, there are more filtering modules in the circuit which are connected in parallel according to different power grades; and if the range of the output power of the grid-connected inverter is not wide and the harmonic requirements are not strict, there are less filtering modules in the circuit which are connected in parallel. Normally, if it is required that the harmonic content of the grid-connected current outputted by the grid-connected inverter in the case of a load factor of 5% is smaller than 5%, only two filtering modules connected in parallel are necessary. Furthermore, the AC filters in the filtering modules connected in parallel are not limited to the LC filters shown in FIG. 2, LCL filters, for example, may also be used as the AC filters in the filtering modules, and the elements in the LCL filters can be selected according to the power capacity design described above.

Figure 3:
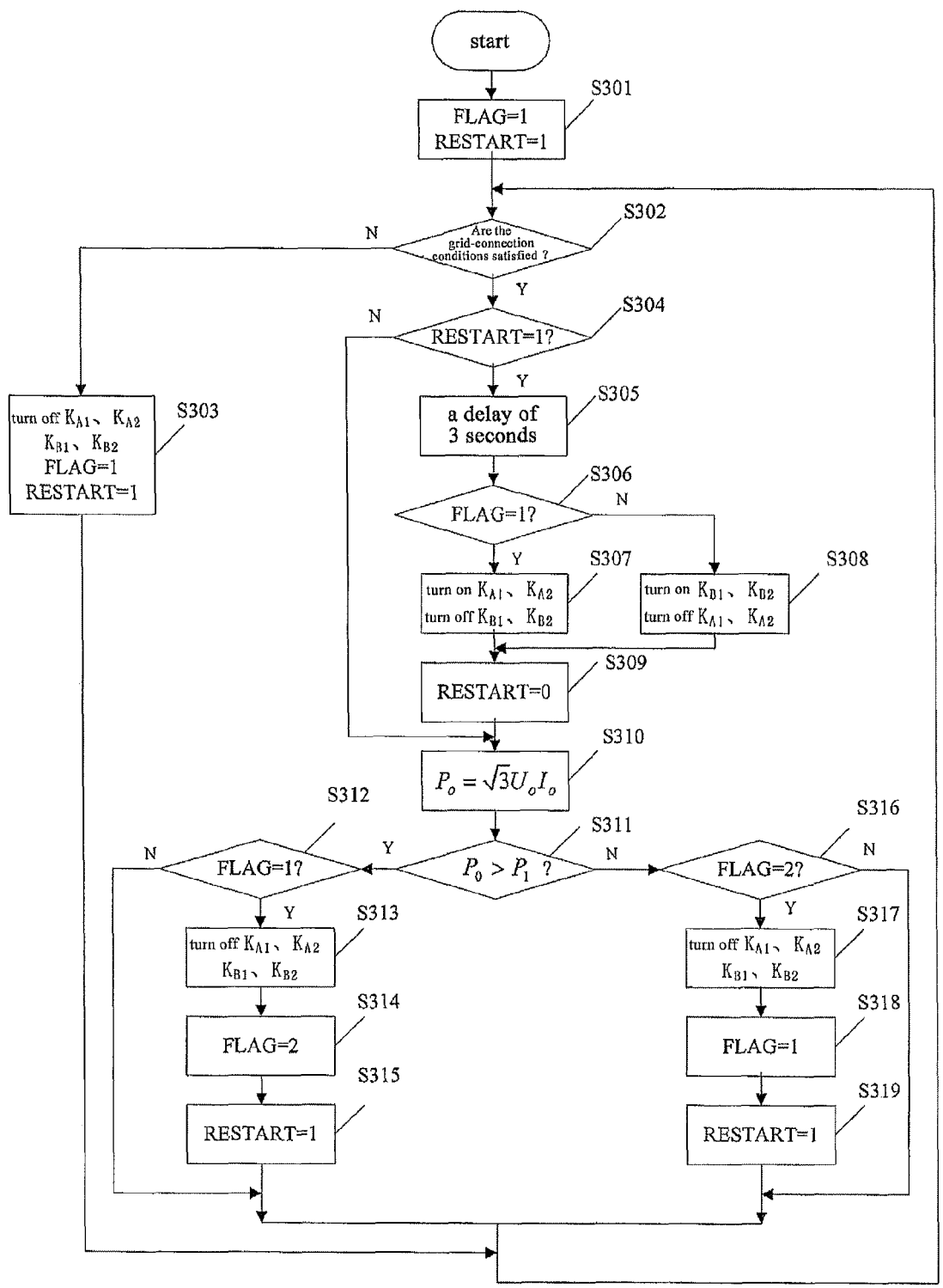
FIG. 3 is a flow chart of a method for filtering the AC output of the grid-connected inverter according to the embodiment of the present invention.

FIG. 3 is a flow chart of a double filtering method executed by the control circuit 60. In this method, the following status words are set:

"FLAG" is a filtering module selection tag;

"FLAG=1" indicates that the filtering module A (the auxiliary filtering module) is selected or the filtering module A is being operated;

"FLAG=2" indicates that the filtering module B (the main filtering module) is selected or the filtering module B is being operated;

"RESTART" is a warm start tag of the grid-connected inverter;

"RESTART=1" indicates that warm start of the grid-connected inverter is needed;

"RESTART=0" indicates that the warm start has been finished.

As shown in FIG. 3, after the grid-connected inverter starts operation, in step S301, the status words are firstly initialized to let FLAG=1 and RESTART=1.

Next, in step S302, the monitoring module 50 is controlled to monitor grid-connection conditions of the grid-connected inverter, wherein, the grid-connection conditions include (1) the voltage, frequency, amplitude and phase of the power gird conform to a preset grid-connection condition; and (2) a PV array voltage reaches the minimum starting voltage of the inverter. The inverter can be operated in a grid-connected manner as long as the two conditions are satisfied.

If the grid-connection conditions are not satisfied, in step S303, all the AC contactors $K_{A1}$, $K_{A2}$, $K_{B1}$ and $K_{B2}$ are controlled to be turned off, FLAG is set to be equal to 1, RESTART is set to be equal to 1, and then the step S302 is executed again to continue monitoring the grid-connection conditions.

If the grid-connection conditions are satisfied, in step S304, it is determined whether the status word RESTART is equal to 1, that is, it is determined whether warm start of the grid-connected inverter is needed. If RESTART=0, it indicates that the warm start of the grid-connected inverter has been finished, then step S310 is executed to perform subsequent realtime switching operation. If RESTART=1, it indicates that warm start of the grid-connected inverter is needed, then in step S305, a delay of 3 seconds is performed firstly for the reason that in realtime switching control, actual hardwares such as the AC contactors need certain time to be turned off. Therefore, in order to leave enough time for the AC contactors $K_{A1}$, $K_{A2}$, $K_{B1}$ and $K_{B2}$ to be turned off thoroughly, delay is desired. The delay time in the step S305 is set as 3 seconds for the sake of safety, however, the delay time may be set as any value ranging from 1 second to 3 seconds. Then, in step S306, it is determined whether the status word FLAG is equal to 1. If FLAG=1, it indicates that the filtering module A is selected to be operated, then the AC contactors $K_{B1}$, $K_{B2}$ are controlled to be turned off and the AC contactors $K_{A1}$, $K_{A2}$ are controlled to be turned on in step S307. If FLAG≠1 (that is, FLAG=2), it indicates that the filtering module B is selected to be operated, then the AC contactors $K_{A1}$, $K_{A2}$ are controlled to be turned off and the AC contactors $K_{B1}$, $K_{B2}$ are controlled to be turned on in step S308. Next, in step S309, RESTART is set to be equal to 0, which indicates that the warm start has been finished, and then the step S310 is executed to perform subsequent realtime switching operation.

In the step S310, the output power (i.e. $P_0=\sqrt{3}U_0I_0$) of the grid-connected inverter is calculated according to the outputted AC voltage $U_0$ and AC current $I_0$ monitored by the monitoring module 50.

Next, in step S311, it is determined whether the calculated output power $P_0$ is greater than a preset reference value $P_1$, wherein, $P_1$ should be consistent with the power capacity of the auxiliary filtering module (i.e. the filtering module A). For example, as for an inverter of 500 KW, if the filtering module A is designed according to 100 KW, $P_1$ should be 100 KW. With the reference value $P_1$ thus set, two power grades can be divided, that is, a first power grade of 100 KW~500 KW and a second power grade of 0 KW~100 KW.

If it is determined that $P_0>P_1$ in the step S311, it indicates that the output power $P_0$ belongs to the first power grade, then the main filtering module (the filtering module B) ought to be used to perform filtering, thus it is determined whether FLAG is equal to 1 in step S312. If FLAG=1, all the AC contactors $K_{A1}$, $K_{A2}$, $K_{B1}$ and $K_{B2}$ are turned off in step S313, FLAG is set to be equal to 2 in step S314 and RESTART is set to be equal to 1 in step S315 to prepare for switching to the filtering module B, and then the step S302 is executed to continue the monitoring. If FLAG≠1, it means that FLAG=2 and indicates that the filtering module B is being operated and switching to the filtering module B is unnecessary, the step S302 is executed directly to continue the monitoring.

If it is determined that $P_0<P_1$ in the step S311, it indicates that the output power $P_0$ belongs to the second power grade, then the auxiliary filtering module (i.e. the filtering module A) ought to be used to perform filtering, thus it is determined whether FLAG is equal to 2 in step S316. If FLAG=2, all the AC contactors $K_{A1}$, $K_{A2}$, $K_{B1}$ and $K_{B2}$ are turned off in step S317, FLAG is set to be equal to 1 in step S318 and RESTART is set to be equal to 1 in step S319 to prepare for switching to the filtering module A, and then the step S302 is executed to continue the monitoring. If FLAG≠2, it means that FLAG=1 and indicates that the filtering module A is being operated and switching to the filtering module A is unnecessary, the step S302 is executed directly to continue the monitoring.

Through the above processes, the control circuit 60 controls the on-off states of the AC contactors $K_{A1}$, $K_{A2}$, $K_{B1}$ and $K_{B2}$ according to the realtime output power of the grid-connected inverter, so as to perform switching to the filtering module having the power capacity corresponding to the power grade of the output power.

As seen from the flow chart of FIG. 3, the monitoring module 50 performs realtime monitoring not only on the AC voltage and the AC current outputted by the grid-connected inverter but also on the grid-connection conditions of the grid-connected inverter, and determines whether the grid-connected inverter satisfies the grid-connection conditions. The control circuit 60 controls the on-off state of the AC output filter according to a result obtained by the monitoring module 50 of whether the grid-connected inverter satisfies the grid-connection conditions, that is, if the grid-connection conditions are not satisfied, the control circuit 60 performs control to turn off all the filtering modules in the AC output filter; and if the grid-connection conditions are satisfied, the control circuit performs control to turn on a corresponding filtering module in the AC output filter.

Hereinafter, the technical effect of the present invention will be illustrated by experimental comparison. In the following experiments for comparison, a grid-connected inverter has a rated power of 500 KW, and the relevant standards (such as IEEE 929-2000, Technical Specification and Test Method of Grid-connected PV Inverter below 400 V, etc.) require that THD of the output current of the inverter is lower than 5%.

Table 1 is given below for comparative analysis regarding total harmonic distortion (THD) and conversion efficiency of the inverter of 500 KW with different load factors in the cases of the single filtering manner and the double filtering manner.

TABLE 1

| load factor | operating current | THD | | efficiency | |
| --- | --- | --- | --- | --- | --- |
| | | single filtering | double filtering | single filtering | double filtering |
| 5% | 48 | 17.2% | 3.1% | 95.81% | 97.63% |
| 10% | 96 | 15.1% | 3.3% | 97.66% | 98.54% |
| 15% | 144 | 9.5% | 3.4% | 98.26% | 98.78% |
| 20% | 192 | 6.9% | 3.4% | 98.56% | 98.88% |
| 30% | 289 | 4.2% | 4.5% | 98.82% | 98.82% |
| 40% | 385 | 3.9% | 3.8% | 98.93% | 98.93% |
| 50% | 481 | 3.2% | 3.2% | 98.98% | 98.98% |
| 60% | 577 | 3.1% | 3.1% | 98.99% | 98.99% |
| 70% | 674 | 2.8% | 2.9% | 98.98% | 98.98% |
| 80% | 770 | 2.7% | 2.8% | 98.97% | 98.97% |
| 90% | 866 | 2.5% | 2.6% | 98.95% | 98.95% |
| 100% | 962 | 2.5% | 2.6% | 98.85% | 98.85% |

Figure 4:
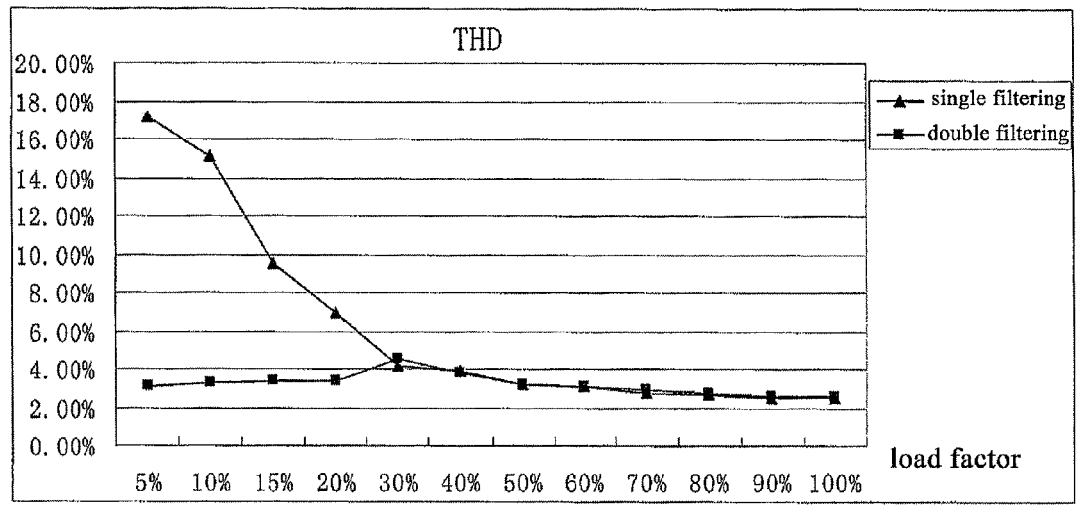
FIG. 4 is a THD comparison diagram of a single filtering manner in prior art and a double filtering manner according to the present invention.
Figure 5:
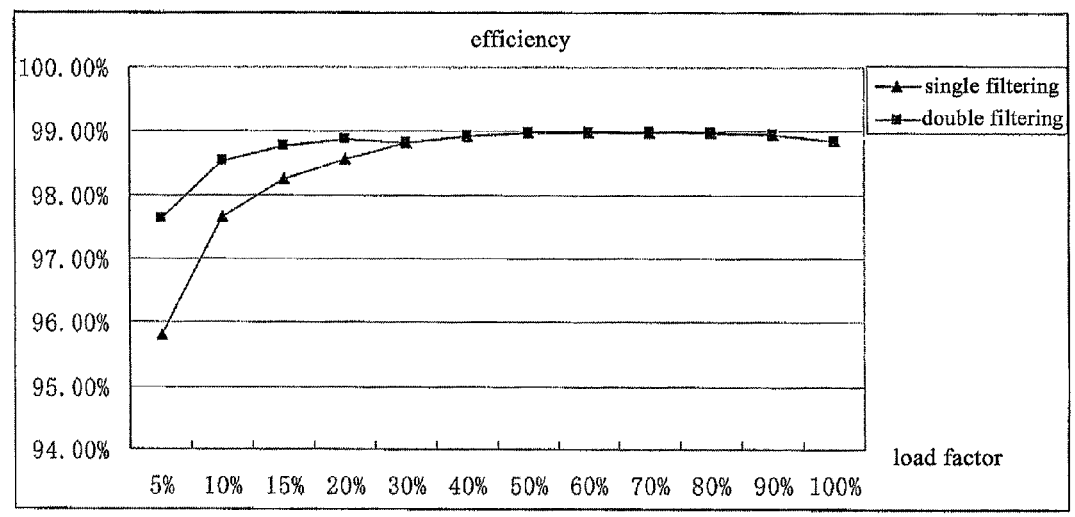
FIG. 5 is a conversion efficiency comparison diagram of the single filtering manner in the prior art and the double filtering manner according to the present invention.

FIGS. 4 and 5 are curve diagrams showing the experimental data of Table 1. As seen from Table 1, and FIGS. 4 and 5, by comparison with the single filtering manner, in the case of a low load factor, the THD is reduced remarkably and the conversion efficiency is improved to some extent in the double filtering manner.

Hereinbefore, the present invention has been described in detail in connection with the embodiment with reference to the drawings. However, it should be understood that the present invention is not limited to the specific embodiment disclosed above and any alteration and modification that those skilled in the art can conceive based on the disclosure should be included in the scope of the invention.

The invention claimed is:
1. A grid-connected inverter comprising:
   an AC output filter which includes two or more switchable filtering modules connected in parallel, power capacity of each filtering modules corresponding to a different output power of the grid-connected inverter;
   a monitoring module which is connected to an AC output end of the grid-connected inverter and is used to perform realtime monitoring on AC voltage and AC current outputted by the grid-connected inverter; and
   a control circuit which is connected between the monitoring module and the AC output filter, and is used to calculate the output power of the grid-connected inverter according to the voltage and the current monitored by the monitoring module and control, according to a power grade of the calculated output power, switching to the filtering module having the power capacity corresponding to the power grade, the power grade being selected from a plurality of power grades which are divided according to power capacities of the filtering modules;
   wherein each of the filtering modules includes an LC/LCL AC filter and a first AC contactor which are connected in series, a filter capacitor branch in the LC/LCL AC filter includes a filter capacitor and a second AC contactor which are connected in series, and
   wherein the control circuit controls switching to the corresponding filtering modules by controlling on-off states of the first AC contactor and the second AC contactor in each of the filtering modules.

2. The grid-connected inverter according to claim 1, wherein in each of the filtering modules, a model of the filter capacitor and that of the second AC contactor are selected according to the power capacity of each filtering module, and the model of the first AC contactor is selected according to a magnitude of an output current of the grid-connected inverter.

3. The grid-connected inverter according to claim 2, wherein the AC output filter includes two filtering modules connected in parallel, wherein, one serves as a main filtering module whose power capacity is the rated output power of the grid-connected inverter, and the other serves as an auxiliary filtering module whose power capacity is 5%~40% of the rated output power of the grid-connected inverter.

4. The grid-connected inverter according to claim 3, wherein the preferable power capacity of the auxiliary filtering module is 15%~30% of the rated output power of the grid-connected inverter.

5. The grid-connected inverter according to claim 1, wherein
the monitoring module is further used to perform realtime monitoring on grid-connection conditions of the grid-connected inverter and determine whether the grid-connected inverter satisfies the grid-connection conditions, and
the control circuit is further used to control the on-off state of the AC output filter according to a result obtained by the monitoring module of whether the grid-connected inverter satisfies the grid-connection conditions, that is, if the grid-connection conditions are not satisfied, the control circuit performs control to turn off all the filtering modules in the AC output filter; and if the grid-connection conditions are satisfied, the control circuit performs control to turn on a corresponding filtering module in the AC output filter.

6. The grid-connected inverter according to claim 1, wherein the number of the filtering modules in the AC output filter is selected according to a range of the output power of the grid-connected inverter and harmonic requirements for the grid-connected inverter in the case of the lowest load factor.

7. A method for filtering AC output of a grid-connected inverter, the grid-connected inverter comprising an AC output filter which includes two or more switchable filtering modules connected in parallel, power capacity of each filtering modules corresponding to a different output power of the grid-connected inverter, the method comprising:

performing realtime monitoring on AC voltage and AC current outputted by the grid-connected inverter;
calculating the output power of the grid-connected inverter according to the monitored voltage and current; and
controlling, according to a power grade of the calculated output power, switching to the filtering module having the power capacity corresponding to the power graded, the power grade being selected from a plurality of power grades which are divided according to power capacities of the filtering modules;
wherein in the case that each of the filtering modules includes an LC/LCL AC filter and a first AC contactor which are connected in series and a filter capacitor branch in the LC/LCL AC filter includes a filter capacitor and a second AC contactor which are connected in series, switching to the corresponding filtering module is controlled by controlling on-off states of the first AC contactor and the second AC contactor in each of the filtering modules.

8. The method according to claim 7, wherein in each of the filtering modules, a model of the filter capacitor and that of the second AC contactor are selected according to the power capacity of each filtering module, and the model of the first AC contactor is selected according to a magnitude of an output current of the grid-connected inverter.

9. The method according to claim 8, wherein the AC output filter includes two filtering modules connected in parallel, wherein, one serves as a main filtering module whose power capacity is the rated output power of the grid-connected inverter, and the other serves as an auxiliary filtering module whose power capacity is 5%~40% of the rated output power of the grid-connected inverter.

10. The method according to claim 9, wherein the power capacity of the auxiliary filtering module is 15%~30% of the rated output power of the grid-connected inverter.

11. The method according to claim 7, further comprising performing realtime monitoring on grid-connection conditions of the grid-connected inverter, and performing control to turn off all the filtering modules in the AC output filter if the grid-connection conditions are not satisfied, while performing control to turn on a corresponding filtering module in the AC output filter if the grid-connection conditions are satisfied.

12. The method according to claim 7, further comprising selecting the number of the filtering modules in the AC output filter according to the range of the output power of the grid-connected inverter and harmonic requirements for the grid-connected inverter in the case of the lowest load factor.

* * * * *